United States Patent [19]
Mostrom

[11] 3,923,370
[45] Dec. 2, 1975

[54] HEAD MOUNTED DISPLAYS

[75] Inventor: Richard N. Mostrom, Edina, Minn.

[73] Assignee: Honeywell Inc., Minneapolis, Minn.

[22] Filed: Oct. 15, 1974

[21] Appl. No.: 514,512

[52] U.S. Cl. .................. 350/55; 350/294; 350/298; 350/301
[51] Int. Cl.[2] .......................................... G02B 17/00
[58] Field of Search ............. 350/55, 145, 146, 294, 350/298, 301

[56] References Cited
UNITED STATES PATENTS

| | | | |
|---|---|---|---|
| 3,059,519 | 10/1962 | Stantun | 350/145 |
| 3,787,109 | 1/1974 | Visenor | 350/301 X |

FOREIGN PATENTS OR APPLICATIONS

| | | | |
|---|---|---|---|
| 757,167 | 9/1956 | United Kingdom | 350/298 |

*Primary Examiner*—James B. Mullins

[57] ABSTRACT

A head mounted display comprising a helmet having a visor which is, at least in part, a paraboloid, two portions of which are treated so as to be at least partially reflective. The visor is attached to a helmet adapted to be worn by a person. Also mounted on the helmet is projection apparatus and a reflective surface which is located substantially in a plane perpendicular to the axis of revolution of the paraboloid and passing through the focal point thereof. The projection apparatus transmits light from a desired object to the first of the reflective portions of the visor where that light is reflected to the reflective surface on the helmet and thence reflected to the second of the reflective portions on the visor where a final reflection of the rays produces the desired image within the field of view of the person wearing the helmet. The invention is characterized by placing the optical elements of the system non-symmetrically about the axis of revolution of the paraboloid, such that the reflective surface on the helmet is substantially out of the field of view of the person.

8 Claims, 3 Drawing Figures

PRIOR ART FIG. 1

HEAD MOUNTED DISPLAYS

BACKGROUND OF THE INVENTION

This invention relates to a head mounted display for producing an image which may be viewed by the person wearing the headgear.

Apparatus of this sort finds use in many fields such as in training aids, machine control or entertainment but will be described here in connection with a helmet worn by the pilot of an aircraft. The image to be displayed may consist of aircraft indicator readings, radar presentations, maps, weapon aiming aids, or other displays, found useful by pilots in the accomplishment of their missions. While the image may be derived from a variety of sources, such as film, television, or the real world, it will be described herein as being derived from the face of a cathode ray tube mounted on the pilot's helmet. A system of mirrors and lenses is used to convey the light from the cathode ray tube to a position on the helmet visor where its image may be observed by the pilot.

DESCRIPTION OF THE PRIOR ART

Systems for displaying images to the pilots of aircraft are well known in the art. Some of these systems are helmet mounted, as in the Richard P. Vizenor U.S. Pat. No. 3,787,109, issued Jan. 22, 1974, and in the William H. Rymes U.S. Pat. No. 3,833,300, isssured Sept. 3, 1974. Both of these inventions utilize a paraboloidal visor in which a desired image is produced by reflection from a portion of the visor for viewing by the pilot. A paraboloidal visor has been found to be highly desirable in such systems since light rays emanating from its focal point emerge parallel, thereby positioning the image at infinity with the absence of spherical aberration.

Both the Vizenor patent and the Rymes patent utilize this feature. In the Vizenor patent, a projector is mounted on the visor so that the light from the device appears to come from the focal point of the paraboloid, and in the Rymes patent, the fiber optic bundle is placed with its end at the focal point. In both cases, light rays which produce the resultant image are parallel when entering the viewer's eye. It has been found, however, that the projector or mirror of the Vizenor patent occupies a portion on the visor which is within the field of view of the pilot and produces at least irritation and possible danger by obscuring part of his vision. It has also been found that the fiber optic bundle of the Rymes patent produces an image that is too low in intensity and too faint to be readily usable by the pilot.

Both of these systems also suffer from certain aberration problems, particularly comatic aberration, and are limited by the field of view which is available. A prior art helmet mounted display which corrects for the aberration and provides a wider field of view has been developed by the assignee of the present invention and will be described in connection with FIG. 1 of the present application.

More specifically, this prior art consists of an optical system which projects the light from an object onto a first reflective portion of the paraboloid from whence it is reflected to a central mirror where it is again reflected to a second reflective portion of the paraboloid for viewing by the pilot. This double reflective system is symmetrical about the axis of rotation of the paraboloid with the "aperture" of the central mirror being centered around the focal point.

As used herein, the aperture of any reflective or light transmissive surface is that area on the surface which is necessary to meet the field of view and the exit pupil requirements of the system. The "exit pupil" is that area in which the pilot can move his eye, vertically and horizontally, and still see the field of view, or the total angular subtense of the display image. By this construction, comatic aberration is substantially eliminated, the field of view is increased, and the image intensity is quite adequate. This prior art teaches the desirability of a symmetrical system to prevent coma and spherical aberration. The difficulty with this arrangement is that the central mirror, the center of the aperture of which is located at the focal point of the paraboloid, still occupies a position which obstructs part of the field of view of the pilot. Attempts to move the mirror out of the field of view of the pilot have been hindered by the space limitations of the pilot's helmet within the cockpit and by the proximity of the helmet in the area of the central mirror to the head of the pilot. With these limitations, it has been found impossible to alter the position of the central mirror so that it is out of view of the pilot while still retaining the double reflecting, symmetrical optical system.

The present invention overcomes the problems of the prior art by providing a double reflective system which allows a high level of image intensity and eliminates comatic and spherical aberration but, contrary to the teachings of the prior art, arranges the optical elements non-symmetrically about the axis of the paraboloid. As will be seen, this arrangement enables the mirror to be raised substantially out of the field of view of the pilot. While the predicted astigmatism and other aberrations do result from the non-symmetrical arrangement, these are reducible with standard procedures utilized in the projection system itself.

BRIEF SUMMARY OF INVENTION

The present invention employs a helmet having a transparent visor at least partially shaped in the form of a paraboloid. Two portions of this paraboloid are coated so that light may be reflected therefrom. A projection system which may also be mounted on the helmet is utilized to direct light from a desired object to the first of these reflective portions. Light reflected from the first of the reflective portions is directed toward a reflective surface or mirror mounted on the helmet and from there is reflected to a second of the reflective portions which is within the pilot's field of view. More specifically, the invention comprises the placing of the optical elements such that the aperture of the second of the reflective portions lies at an angle upward from the line of sight of the pilot which is parallel to the axis. The reflective surface mounted on the helmet is then caused to lie upward from the axis of revolution of the paraboloid and is substantially removed from the field of view of the pilot thereby overcoming the principal objection to the prior art. The present invention also has the advantage that by raising the area viewed by the pilot upwardly from the line of sight which is parallel to the axis of the paraboloid, the pilot is enabled to receive a better view of the instruments in the cockpit normally located below this line of sight, whereas these were partially obscured by the projected image and the second reflective portion on the visor of the prior art.

Various other objectives, advantages and features of novelty which characterize the present invention are pointed out with particularity in the claims annexed hereto and forming a part hereof.

For a better understanding of the invention and its objectives, reference should be made to the drawings which form a further part hereof and to the accompanying descriptive matter in which there is illustrated and described the preferred embodiment of the invention.

BRIEF DESCRIPTION OF THE DRAWINGS

FIG. 1 is a side view of the helmet mounted display known in the prior art;

DESCRIPTION OF THE DRAWING

Figure 3:
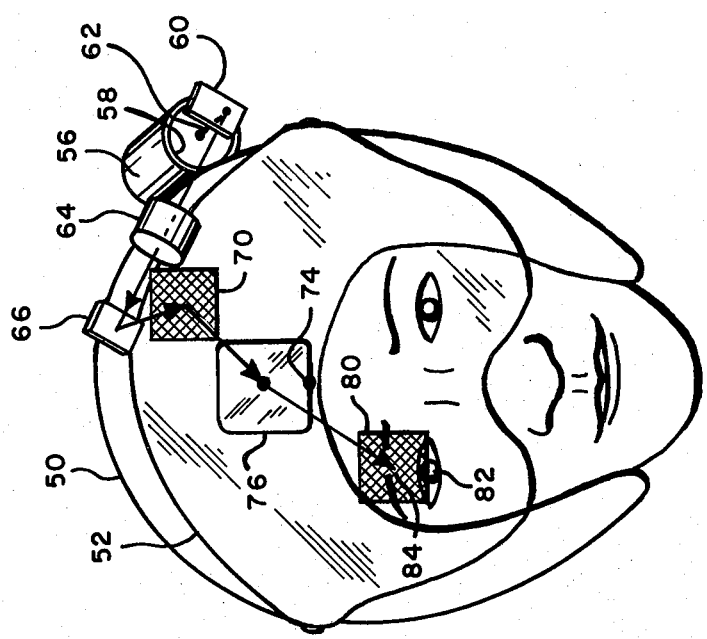
FIG. 3 is front view of the preferred embodiment of the present invention.

FIG. 1 shows the prior art over which the present invention is an improvement. In FIG. 1, a pilot is shown wearing a helmet 10, to which is affixed a transparent visor 12. An optical system for projecting an image is shown symbolically as CRT and projection optics 14. The CRT and projection optics 14 may comprise a standard cathode ray tube and various lenses and mirrors which may better be seen in connection with FIG. 3. The light to be projected from the CRT and projection optics 14 is shown as a bundle of rays 16 being projected onto the surface of visor 12 in an area shown as a curved line 20. Area 20 lies on the surface of visor 12 and is coated so as to make the area 20 at least partially reflective to the light being projected from the CRT and projection optics 14. Alternately, in both the prior art and in the present invention, area 20 may be coated so as to reflect all light incident thereon within the first range of wavelengths but be transmissive to light of all other wavelengths. Area 20 on visor 12 is a portion of a paraboloid having an axis of revolution identified in FIG. 1 as axis 22. In making visor 12, it may be convenient to have a large portion of the visor formed as a paraboloid by methods such as are taught in the co-pending George D. Hedges patent application, Ser. No. 369,357, filed June 12, 1973, and assigned to the assignee of the present invention, but for purposes of the prior art and for the present invention only the partially reflective areas need be paraboloidal.

As seen in FIG. 1, light striking area 20 is reflected downwardly and to the left towards a reflecting surface or mirror 24 mounted on the front of helmet 10. Mirror 24 preferably is a flat mirror lying in a plane 25 perpendicular to axis 22 and passing through the focal point 26 of the paraboloid and, more particularly, situated so that the aperture thereof is centered at the focal point 26 of the paraboloid.

As seen in FIG. 1, light striking mirror 24 is reflected downwardly and to the right to a second area 30 located on the surface of the visor 12. Area 30, like area 20, is part of a surface of the same paraboloid and is coated so as to be at least partially reflective to the light incident thereon. The above described optical system causes the light reflected from area 30 to produce the desired image which may be viewed by the eye 32 of the pilot. Since mirror 24 is in the plane perpendicular to the axis of revolution at the focal point of the paraboloid, light reflected from area 30 is substantially parallel causing the image to appear at infinity to the pilot.

In FIG. 1, the center of the aperture of area 30 and thus the center of the image which is seen by the pilot is identified as point 33. This is not necessarily the center of area 30. A line drawn from the eye 32 through the point 33 is shown as an arrow representing the display LOS (line of sight) 34. It should be noted that in the prior art the display LOS 34 is parallel to the axis 22 of the paraboloid. This results from the symmetrical arrangement of the optics of the system wherein the aperture of mirror 24 is centrally located on the axis of the paraboloid and areas 20 and 30 are located at equal distances on opposite sides of the axis. Actually, area 20 lies above the axis and somewhat into the plane of the drawing, while area 30 lies below the axis and somewhat out of the plane of the drawing as will be better seen with reference to FIG. 3.

The prior art system of FIG. 1 has the advantage of providing a high level intensity display with a very wide field of view. It also minimizes astigmatism and compensates for coma. The primary disadvantage of the system of FIG. 1 lies in the fact that the mirror 24 and area 20 occupy positions which are within the field of view of the pilot.

The upward field of view of an average person is in the neighborhood of 54° from his horizontal line of sight. Mirror 24 and area 20 are seen to lie at about 45° and thus obscure the upward vision of the pilot, a situation which is not only irritating but potentially dangerous. Mirror 24 cannot be moved to the left any fruther than shown in FIG. 1 due to the fact that the protective material between helmet 10 and the forehead of the pilot must occupy this space. Attempts to raise the axis 22 and thus the mirror 24 are hindered by the space available within the cockpit. Raising axis 22 requires raising visor 12 with respect to the pilot's head but doing so causes the visor to interfere with upward portions of the cockpit. Any attempts to adjust the curvature of the paraboloid of visor 12, thus changing the focal length, also produces an extension of the visor to the right in FIG. 1 which becomes unwieldy for the pilot. Since the paraboloidal visor has been found to be the most efficient in helmet displays because it eliminates spherical aberration and focuses the image at infinity, it has heretofore been deemed impossible to move mirror 24 out of the pilot's field of view.

Figure 2:
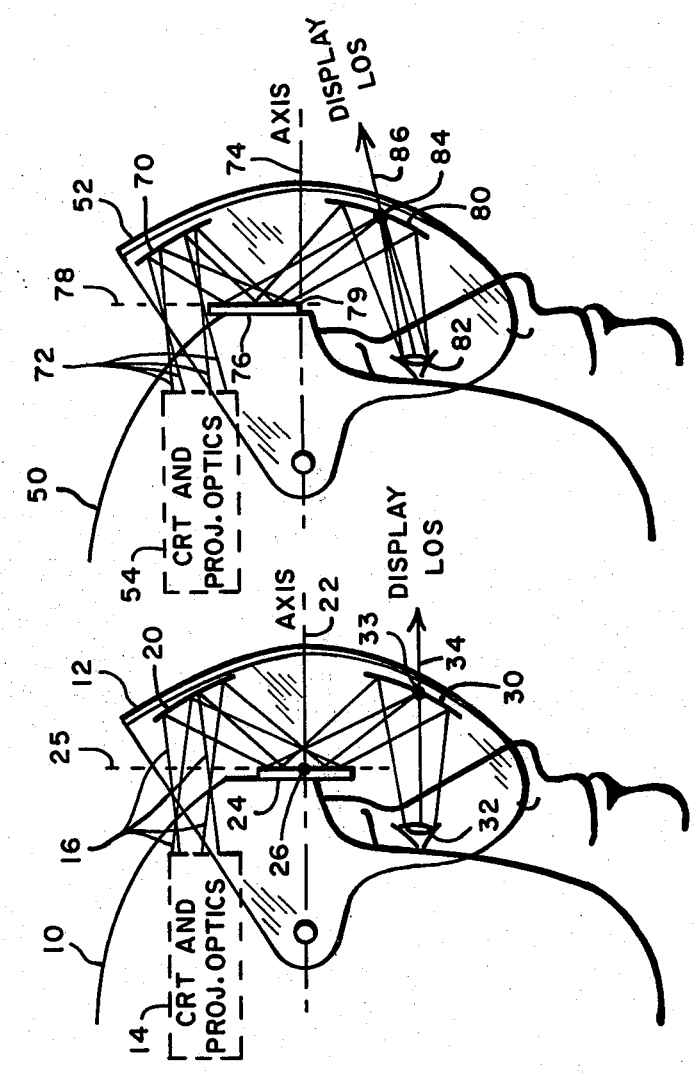
FIG. 2 is a side view of the preferred embodiment of the present invention.

FIGS. 2 and 3 show the present invention which incorporates all of the advantages of the prior art, including high intensity image, no comatic aberration and a wide field of view but which also allows the central mirror to be raised out of the field of view of the pilot while at the same time maintaining the outer dimensions of the helmet and the distance between the front of the helmet and the pilot's head.

In FIGS. 2 and 3 representing a side view and front view of the invention, respectively, like reference numerals will be used to represent the same elements. As with respect to FIG. 1, a helmet 50 has a transparent visor 52 mounted thereon. A cathode ray tube and projection optics box 54 is shown in FIG. 2 to represent elements better seen in FIG. 3. In FIG. 3 a cathode ray tube 56 is mounted on the left side of the helmet by means not shown. A field lens 58 is mounted so as to transmit the light from the face (object surface) of the cathode ray tube 56 to a first mirror 60. For simplicity in FIG. 3 a single central ray has been shown bearing reference numeral 62 which is reflected off the surface of mirror 60 and progresses through a projection lens system 64 to a second mirror 66. While a cathode ray tube has been used with respect to the invention in all of the FIGURES, any sort of object source could be utilized instead. Furthermore, while the mirrors 60 and 66 have been shown as generally rectangular, their shapes are arbitrary and need only be large enough to accommodate the reflections of light necessary. In actual practice, the cathode ray tube 56, field lens 58, mirror 60, projection lens system 64 and mirror 66, would be enclosed in a tube like arrangement not shown. Elements 56–66 comprise the cathode ray tube and projection optics 54 of FIG. 2. In FIGS. 2 and 3, light from the CRT and projection optics is transmitted to a first area 70 located on the surface of visor 52. Area 70 like area 20 of FIG. 1 has been coated or treated so as to be at least partially reflective to light or discriminatorily reflective to certain wavelengths of light.

In FIG. 2 the envelope of light transmitted from the CRT and projection optics 54 is shown by lines 72. As with area 20 in FIG. 1, area 70 in FIG. 2, forms a part of the surface of a paraboloid having an axis of revolution 74. The light striking area 70 is reflected to a mirror 76 which is located in a plane 78 perpendicular to axis 74 and passing through the focal point 79 of the paraboloid but unlike FIG. 1, the aperture of mirror 76 is centered at a point significantly above focal point 79.

Light striking mirror 76 is reflected to a second area 80 on the surface of visor 52. Second area 80 like area 70 forms a portion of the surface of the paraboloid having axis 74 and is treated or coated such as to partially reflect light incident thereon. While areas 70 and 80 have been shown in FIG. 3 as substantially square, their shape is of little importance so long as they are large enough to reflect the desired light. The actual aperture may also be of any desired configuration. In the preferred embodiment, the aperture is actually somewhat rectangular and in area 80 subtends a vertical angle of about 12° and a horizontal angle of about 16° from the pilot's eye.

In FIGS. 2 and 3, the center of the aperture of area 80 and thus the center of the image which is seen by the pilot is identified as a point 84. As with FIG. 1, this is not necessarily the center of the area 80. Also, as with FIG. 1, a line drawn from the eye 82 of the pilot through the point 84 is shown as an arrow representing the display LOS (line of sight) 86. It should be noted that the display LOS 86 is inclined by about 10° from a line extending from the pilot's eye 82 parallel with axis 74. It has been found that an inclination of approximately 10° provides enough displacement of the symmetry of the system about axis 74 to raise mirror 76 beyond the range of vision of the pilot. The line between eye 82 of the pilot and the lower edge of mirror 76 will be 54° or greater with respect to the line extending from the pilot's eye 82 parallel to axis 74. As previously mentioned 54° normally is outside the range of vision of an average person. Raising point 84 much further than 10° results in more aberration than is convenient to compensate for and raising point 84 much less than 10° results in more obscuration of pilot vision by mirror 76 than is desirable. Calculations show that 8° to 14° to be optimum.

In FIGS. 2 and 3, it should be noted that the area 80 is substantially higher on visor 52 than was the area 30 in FIG. 1. This provides the additional advantage of allowing the pilot to check the instruments on his panel which are normally located below the line extending from the pilot's eye 82 parallel with axis 74 without being partially obscured by area 80. Likewise, area 70 in FIG. 2 is higher on visor 52 than was area 20 in FIG. 1 and like mirror 76 is substantially removed from the pilot's field of view.

It has been found that the non-symmetrical arrangement produces increased astigmatism in the optical system. While this astigmatism is undesirable, it has been found to be relatively easily correctable with standard optical techniques in the CRT and projection optics 54. Astigmatism may be reduced by inclining the lenses in the projection optics so as to compensate for the astigmatism introduced by the non-symmetrical arrangement. Field curvature is compensated for by the power of the field lens 58. Distortion which may occur can be compensated for by purposely distorting the image provided by the cathode ray tube. In this way the distortion which is introduced by reflections from areas 70 and 80 will subtract from the distortion introduced by the cathode ray tube with the end result that the image seen by the pilot will be substantially true and correct.

It is thus seen that by the relatively simple invention of raising the display LOS and thus producing a non-symmetrical optical system, the principal disadvantage of the prior art has been overcome.

While the invention has been described with reference to the preferred embodiment and has been shown in connection with use by a pilot in controlling his aircraft, many other applications of the present invention as well as many obvious modifications and alterations to the apparatus disclosed will occur to those skilled in the art.

I therefore do not wish to be limited to the specific apparatus or application described here in connection with the preferred embodiment but rather intend to be limited only by the appended claims.

I claim:

1. In a display apparatus for use with headgear having a visor with at least two partially reflective areas thereon which are part of a paraboloid having an axis of rotation;

means for producing an image;

optical means for projecting light from said means to a first of the two areas on the visor for reflection therefrom to a reflecting surface on the headgear and for reflection therefrom to the second of the two areas on the visor so as to form the desired image for viewing by the wearer, the improvement comprising mounting the optical means and the reflecting areas asymmetrically about the axis such that a line drawn from the eye of the wearer to the center of the aperture of the second of the two areas is at a raised angle with respect to a line drawn from the eye of the wearer parallel to the axis.

2. Apparatus according to claim 1 wherein the raised angle is between 8° and 14°.

3. Apparatus of the class described comprising in combination:

headgear adapted to be worn by a person;

a visor on said headgear having at least two portions on the surface thereof which portions are part of a paraboloid having an axis of rotation, the two portions being coated so as to reflect at least part of the light incident thereon, the two portions lying on the surface of the visor and generally on opposite sides of the axis of rotation;

a reflecting surface on said headgear;

image producing means;

projection means for transmitting light from said image producing means to a first of the two portions where it is reflected to said reflecting surface and from said reflecting surface to the second of the two portions to form the desired image for viewing by the person; the two portions and the reflecting surface being characterized by being nonsymmetrical about the axis and with the reflecting surface being substantially above the field of view of the person.

4. A headgear mounted display comprising in combination:

headgear adapted to be worn by a person;

means for projecting an image;

a visor connected to said headgear;

first and second areas on said visor being portions of a paraboloid having an axis and a focal point, and being at least partly reflective and positioned asymmetrically about the axis;

a reflective surface on said headgear lying substantially in a plane perpendicular to the axis and passing through the focal point, the aperture of said reflective surface being asymmetrical about the axis, said means projecting light to the first of said areas for reflection to said reflective surface and thereafter to the second of the areas so as to form the desired image for viewing by the person.

5. Apparatus according to claim 4 wherein said means is mounted on said headgear.

6. Apparatus according to claim 4, wherein the center of the aperture on the first of the areas is above and to one side of the axis, the center of the aperture on the second of the areas is below and to the other side of the axis and the center of the aperture on the reflective surface is above the axis.

7. Apparatus according to claim 6, wherein the aperture on the second of the areas is centered approximately 10° above a line from the eye of the person parallel with the axis.

8. Apparatus of the class described comprising, in combination:

a helmet adapted to be worn by a person;

a substantially transparent visor mounted on said helmet, said visor being, in part, a paraboloid having an axis of revolution, a focal point, and having first and second reflective portions located generally on opposite sides of the axis of revolution and in the paraboloid part;

a reflective surface mounted on said helmet, generally in a plane including the focal point and perpendicular to the axis of revolution but having an aperture centered at a point above the focal point;

projection means mounted on said helmet for directing light to the first of the reflective portions on said visor where the light is reflected to the reflective surface on said helmet where the light is again reflected to the second of the reflective portions on said visor and an image is formed substantially at infinity for viewing by the person; the second of the reflective portions being placed such that a line from the eye of the person to the center of the aperture of the second of the reflective portions is at a substantial angle to a line extending from the eye of the person parallel with the axis of revolution.

* * * * *